Oct. 29, 1957 C. A. GEISSLER 2,811,235

MACHINE FOR TYPING A TAPE RECORD AND A PROOF SHEET SIMULTANEOUSLY

Filed Nov. 10, 1955 6 Sheets-Sheet 1

INVENTOR.
CARL A. GEISSLER
BY
Jesse A. Holton
ATTORNEY

INVENTOR.
CARL A. GEISSLER
BY Jesse A. Holton
ATTORNEY

Oct. 29, 1957 C. A. GEISSLER 2,811,235

MACHINE FOR TYPING A TAPE RECORD AND A PROOF SHEET SIMULTANEOUSLY

Filed Nov. 10, 1955 6 Sheets-Sheet 3

INVENTOR
CARL A. GEISSLER
BY
Jesse Q. Holton
ATTORNEY

INVENTOR.
CARL A. GEISSLER
BY Jesse A. Holton
ATTORNEY

Oct. 29, 1957 C. A. GEISSLER 2,811,235

MACHINE FOR TYPING A TAPE RECORD AND A PROOF SHEET SIMULTANEOUSLY

Filed Nov. 10, 1955 6 Sheets-Sheet 5

INVENTOR.
CARL A. GEISSLER

BY Jesse A. Holton

ATTORNEY

INVENTOR.
CARL A. GEISSLER
BY Jesse A. Holton
ATTORNEY

United States Patent Office 2,811,235 Patented Oct. 29, 1957

2,811,235

MACHINE FOR TYPING A TAPE RECORD AND A PROOF SHEET SIMULTANEOUSLY

Carl A. Geissler, Manchester, Conn., assignor to Underwood Corporation, New York, N. Y., a corporation of Delaware Application November 10, 1955, Serial No. 546,196

7 Claims. (Cl. 197—1)

This invention relates to typewriters, and more particularly to a double record machine arranged to type a single line record on an elongated strip or tape, and simultaneously to type a separate line-by-line record of the same significance on a proof sheet. The improvements herein follow the generic invention shown and claimed in a copending United States patent application of Robert F. Shaw Serial No. 546,084, filed November 10, 1955, assigned to the same assignee as the present invention. More particularly, this case relates to improved arrangements for supporting, guiding, and feeding or driving a single-line record tape and a single-use inked ribbon in a typewriter made according to one embodiment of the Shaw invention.

The drives for the record tape and the ink ribbon, according to one aspect of the Shaw application, might be of any kinds which meet the performance characteristics involved, namely, to drive the tape and the ribbon in regular increments directly related to the letter spacing steps on the carriage-held proof sheet. The present invention meets these requirements and goes beyond them to provide improved performance of such tape and ribbon drives in a commercially desirable and practical fashion, combining portions of the tape and ribbon drives where possible.

One object of the present invention is to insure operation of the record tape and ink ribbon drives automatically at the proper times and in the proper directions and amounts, depending upon operation of various typewriter keys and other standard controls on the machine.

Another object of the invention is to provide arrangements to align precisely a particular character or portion on a tape record with a corresponding character or space on a previously typed proof sheet, and to maintain regular spacing between characters on the tape, so that errors may be corrected and insertions made on both records with ease.

A further object is to utilize, to a large extent, working mechanisms in existing designs of typewriters, so that a double record machine of the nature desired may be made economically, principally by adding parts to a standard machine.

Another object is to use as far as possible a standard keyboard and other standard control elements in a typewriter of this kind, so that an experienced operator of a standard machine may learn to use the double record machine with a minimum of additional instruction.

One phase of the Shaw invention involves the production of a horizontally condensed spot-coded record of symbols on a tape, while making a legible record of symbols at standard letter spacing on a proof sheet. The coded tape record is intended for later rapid translation and use by a machine which can sense the coded spots, and therefore the spacing intervals of the spots on the tape record must be precise. An added object of the present invention is to provide a reliable precision drive for the code tape which will maintain the desired general difference in horizontal spacing steps between the symbols on the legible proof sheet and the symbols on the code tape, while keeping the desired accuracy of spacing between individual symbols on the tape.

Another object is to provide a machine which will type a record on the tape in single character step spacings only, although the carriage may move the proof sheet in larger amounts including more than a single step during the same record-making cycle.

The above objects are attained in a somewhat conventional typewriter by adding novel tape and ribbon supporting, guiding, and driving mechanisms, and by providing controls for the tape and ribbon drives actuated by standard machine controls which will satisfy the various demands of the altered machine. Power for the tape and ribbon drives is obtained directly from movement of the platen carriage by a train of mechanism. The controls for these drives are actuated from the keyboard and from other standard typewriter control elements to interrupt the driving train automatically and prevent movement of the tape drive for more than one step at a time, regardless of carriage movement.

Other objects, and details of that which is believed to be novel and included in this invention will be clear from the following description and claims, taken with the accompanying drawings in which is illustrated an example of electric typewriter embodying the present invention and incorporating the novel tape and ribbon drives and their controls.

In the drawings:

Figures 1A and 1B, when placed together along their corresponding broken lines, show a fragmentary plan view of front portions of an exemplary typewriter according to this invention, and particularly those portions which support, guide and drive the tape and ribbon;

*Keyboard and controls*

Figure 16:
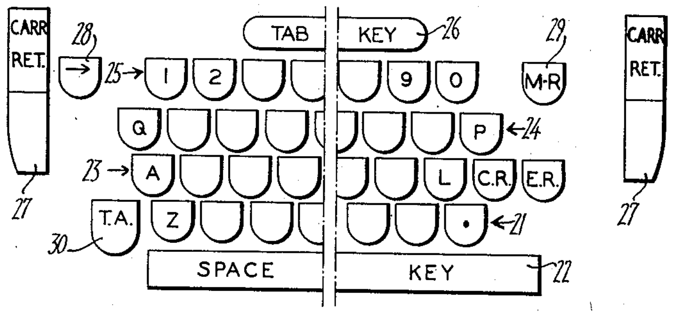
Figure 16 is a reduced size diagram of one keyboard arrangement which may be used with a machine of this invention.

A machine according to this invention does not appear outwardly much different from any ordinary electric typewriter, excepting for the keyboard and for the storage reels, guides and drives for the tape and ribbon. The keyboard, as indicated in Figure 16, is very nearly of standard arrangement, with the exceptions noted below. The first or lowest bank 21 of character keys, just above the usual "space" key or bar 22, has nine separate keys or buttons, for the characters Z, X, C, V, B, N, M, a comma, and a period. The second bank 23 also has nine regular keys for the letters A, S, D, F, G, H, J, K, and L, and two added keys, CR for "Credit" and ER for "Erase." Obviously one or the other of these keys could be placed in the first bank, if desired, and other special keys could be added, to the limit of the capacity of the keyboard and type basket. The third bank 24 carries ten keys, for the letters Q, W, E, R, T, Y, U, I, O, and P. The fourth or top bank 25 contains ten keys, which are used for a complete set of numerical digits, 1, 2, 3, 4, 5, 6, 7, 8, 9, and 0, so that in typing and in the coded record which will be produced, distinctions are made between the letter L and the figure "one," and between the letter O and the figure "zero."

The usual tabulating bar or "Tab" key 26 is located in the center, above the last bank of character keys. Left and right carriage return bars 27 are also provided. A back spacer key 28, marked with an arrow, thus (→), is located on the left of the keyboard approximately opposite the top keyboard bank, and a "margin release" (M-R) key 29 is positioned in a similar location on the right of the keyboard. All of these keys or bars are connected to mechanisms which perform recognized functions in the typewriter. Additionally, some of these keys will be called upon to initiate other operations in the machine, as will be clear at later points in this description.

A special "tape advance" key 30, marked TA, is also provided on the keyboard. Because this machine does not require or have a case shift, this TA key, as shown may occupy the space on the left side of the keyboard which is sometimes reserved for one of the shift keys. The function controlled by this extra key will be explained later, under "Normal typing action."

*Other controls*

A carriage release lever 31 (see Figure 12) is provided on the carriage in the usual location or locations, for disconnecting the carriage from control by its escapement.

On "On-Off" motor control switch knob 32 (see Figures 10 and 11) is also provided, to control the switch which starts or stops the motor which powers the typewriter. This switching arrangement may be as shown in Patent 2,366,107, Helmond, assigned to the same assignee as the present invention.

The construction and operation of both these controls may be as usual in machines of this character, but additional control functions are also performed by these devices, as will later appear.

Other levers, clamps, guides or control devices are provided for positioning, holding and moving a record sheet in the machine, but these need not be altered from their usual forms or be called upon to perform added duties in a machine made according to this invention. The back space key 28 is one of these.

*Tape and ribbon reels*

Figure 3:
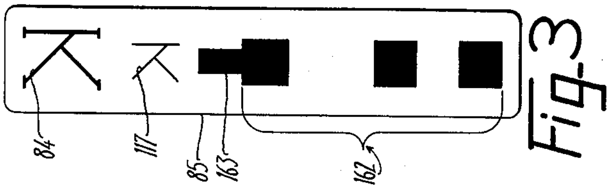
Figure 3 is a greatly enlarged plan view of the single complete type face for the letter "K," showing both a legible symbol and a coded symbol for that character.
Figure 1A:
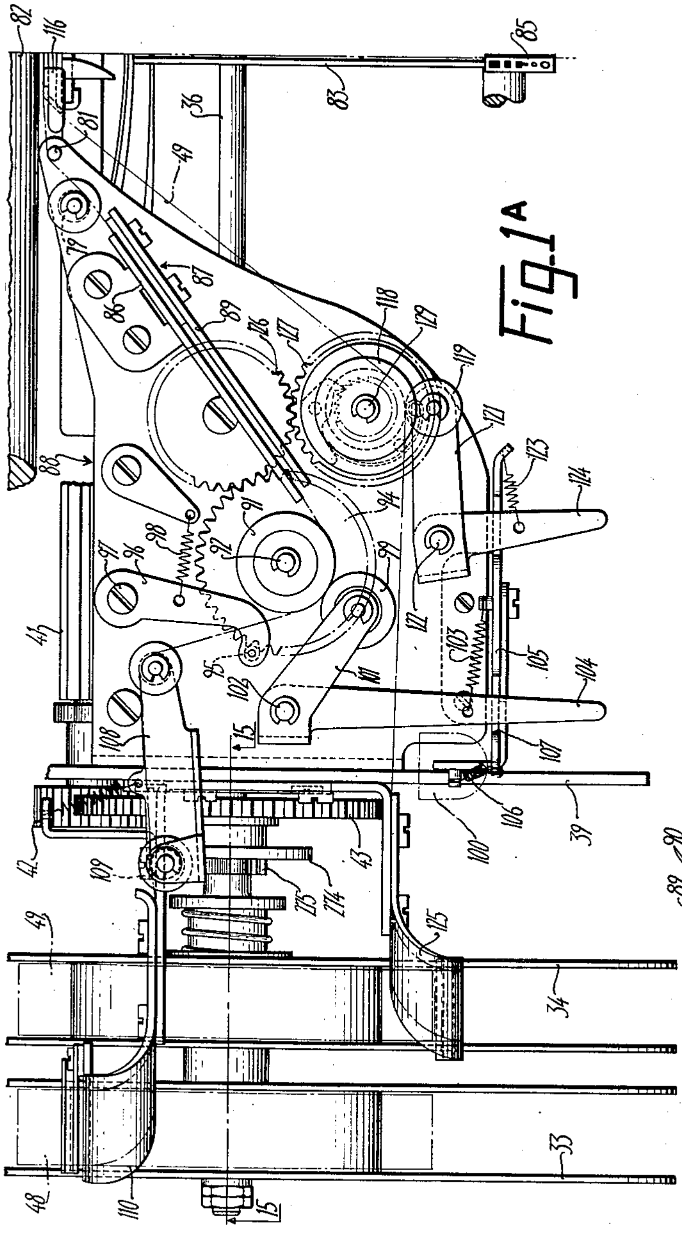
Figure 15:
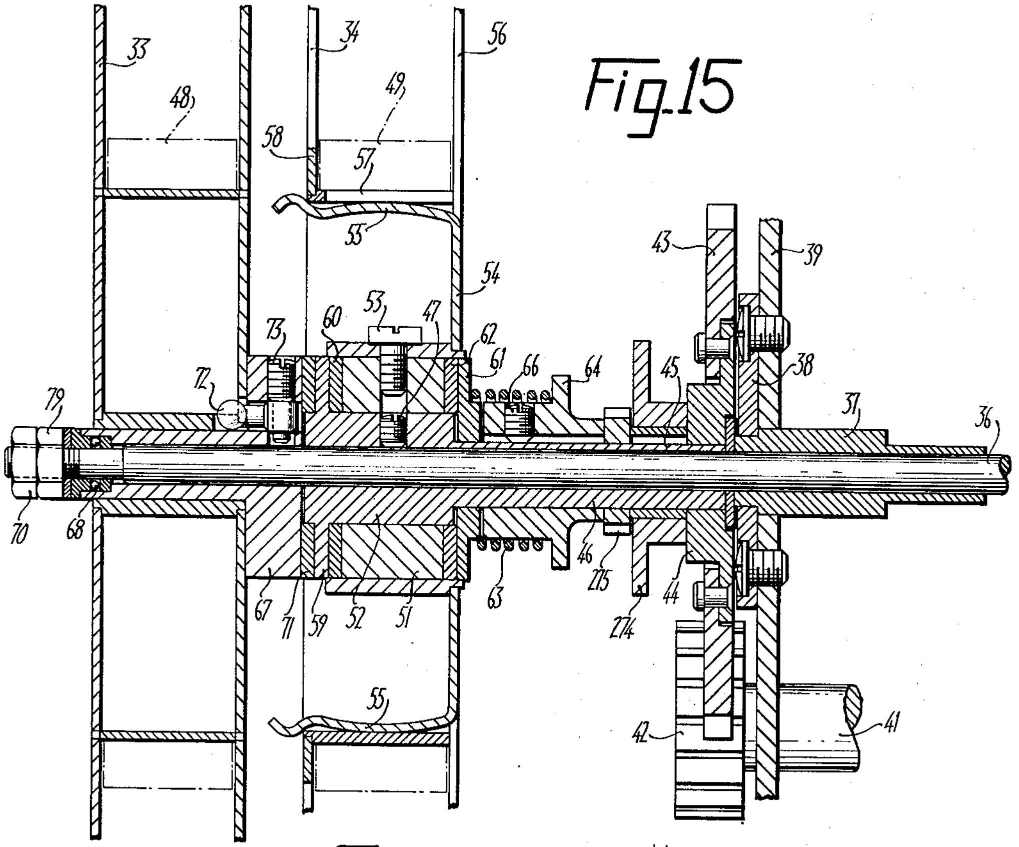
Figure 15 is an enlarged fragmentary vertical sectional view on the line 15—15 of Figure 1A, showing details of the tape and ribbon storage spools and their drive, at the left side of the machine.

The tape reels 33 and the ribbon spools or reels 34 are obviously different from structures on the usual typewriter. These reels are frictionally mounted on either side of the machine on the outer ends of a reel-driving shaft 36, which extends through the entire machine and is rotatably supported as by a bearing sleeve 37 and a bearing plate 38 where the shaft extends through the sides of the housing or casing 39 of the typewriter. Details of this mounting are shown in Figure 15. The outward appearance is clear from Figures 1A and 1B.

The reel-driving shaft 36 is arranged to be continually rotated in a single direction (rearwardly of the machine, when viewed from the top; upwardly, when viewed from the front) when the main driving motor 40 is operating. The motor drives the usual power shaft 41, through suitable belting or other known arrangements (not shown), and the left-hand outer end of the power shaft 41 is extended through the machine housing to carry a pinion 42. Within the machine, the power shaft 41 is fluted, and it is called a snatch roll. Pinion 42 meshes with reel shaft driving gear 43, which is fixed to the reel shaft 36 as by a hub 44 having a D-shaped central opening whose flat portion engages a flat surface 45 on an elongated sleeve 46. The sleeve 46 is secured to shaft 36 as by a set screw 47.

The friction or drag drive between the rotating shaft 36 and the tape and ribbon spools is provided so that the paper record tape 48 and the ink ribbon 49 will be under a constant, balanced, light tension in both directions across the machine, as the tape and ribbon pass from their respective storage reels on the right side of the machine to their storage reels on the left of the machine.

Referring to Figure 15, the necessary frictional coupling to the ribbon reels may be obtained by a ribbon reel bushing 51, loosely surrounding an enlarged cylindrical portion 52 on the sleeve 46. The bushing 51 has secured thereto, as by a machine screw 53, an open spider 54 with a number of axially directed resilient arms 55 and a radially directed side flange 56. The ribbon spool 34 has a central hub 57 with a large opening which may readily be snapped on or off from the spider arms 55. A radially extending flange 58 on the hub completes the ribbon reel. The required frictional drag between the portion 52 of the sleeve 46 and the bushing 51 of the ribbon reel is obtained by a radially extending bearing flange 59 on the portion 52, a bearing washer 60 interposed between the flange 59 and one face of the bushing 51, a pressure plate 61 keyed to be longitudinally slidable along but rotatable with the flattened portion of sleeve 46, and a second bearing washer 62 interposed between the pressure plate and the other face of bushing 51. By adjusting the amount of pressure exerted between the pressure plate and the bearing flange on the opposite faces of the bushing, any desired amount of slipping, and consequent tension, may be obtained. The desired pressure is applied to the pressure plate by one end of a spring 63 bearing thereon, and pressure of the spring may be adjusted by longitudinal movement of the flanged pressure adjustment collar 64, adjustably fixed to sleeve 46 as by a set screw 66 bearing against the flat 45.

A similar frictional drive mounting arrangement may be made for the tape reels, remembering that it is desirable that removal of both reels be made quick and easy for replacement and renewal of the ribbon and tape as they are consumed. The tape reel drive shown here starts with a flanged tape reel bushing 67 which is loosely rotatable on the reel shaft 36. The outer end of this bushing may be provided with a suitable thrust bearing 68, and the bearing and bushing are adjustably held on the shaft by a pressure nut 69 threaded on the end of the shaft, and an added locking nut 70, if necessary. It will be recalled that the sleeve 46 with its bearing flange 59 is locked to rotate with the shaft 36 by set screw 47. Tape reel bushing 67 obtains its frictional drive from flange 59 through an intermediate bearing washer 71, against which the flanged portion of the bushing is pressed when nut 69 is tightened. A conventional ball snap 72, mounted as by a lock screw 73 in the bushing 67, removably holds the tape reel 33 in place on the bushing by engagement with a cooperating snap hole in the reel.

Similar adjustable friction drag driving arrangements are made for the tape and ribbon reels at the other side of the machine, so that the desired balanced tension may be kept on these strips at all times.

*Tape and ribbon feeding*

Figures 1A, 1B, 6, 7, 8 and 12 show the principal elements used in feeding or driving the tape and ribbon.

Starting with the tape reel on the right side of the machine, the blank tape 48 is threaded upwardly from the back side of the spool 33 over a polished twisted guide strap 74 which directs the tape over a horizontal platform or table 75 secured to the machine in a general location usually reserved for a ribbon spool in a standard typewriter. The tape is then passed behind a guide post or roller 76, vertically positioned near the edge of the table in line with the top of the twisted guide. Next, the tape passes in front of a vertical post or roller 77 which is mounted on the movable end of a spring loaded yield arm 78, which cushions the inertia of the loaded reel when tape is fed from the reel. From the yield arm post, the tape is fed over another vertical post or roller 79 on the table near the printing station of the typewriter, and finally behind the right hand one of a pair of printing station tape guides 81, arranged close to the platen 82 on either side of the printing point 80 for the type bars 83. The level of the top edge of the tape at the printing station is just below the lowest impression point for the large legible characters 84 on the type heads 85 carried by the type bars, as will be seen from Figure 5 and as will be explained in more detail later.

From the printing station tape guide 81 on the left side of the machine, the tape, with information recorded on it, passes in front of a second vertical guide post or roller 79, like the first one, and then in front of the upright elongated reflecting back plate 86 of a tape positioning scale 87 which is secured to the left-hand table or platform 88, similar to the right-hand table 75. Spaced slightly in front of the reflecting plate, and in front of the tape, the scale 87 has a transparent front member 89, with vertical lines 90 engraved on its inner surface, for a purpose later explained under "Back Space Action."

Near the other end of the scale 87 the tape passes in front of a capstan 91, fixed on a shaft 92 vertically journaled as at 93 in the table 88. Movement of this shaft and capstan in one direction or the other governs movement of the tape. The precise position of the capstan when it is not being moved is fixed by a gear 94 keyed on shaft 92, and by the engagement of a spring pressed roller detent 95 in the dwells between the teeth on the gear. The detent may be carried on the free end of an arm 96, pivoted at 97 on the table 88, and stressed by a spring 98 toward engagement with the gear. This locates the tape record symbols at precise spacings from each other and holds the tape still when the capstan is not being moved.

Figures 6, 7, 8:
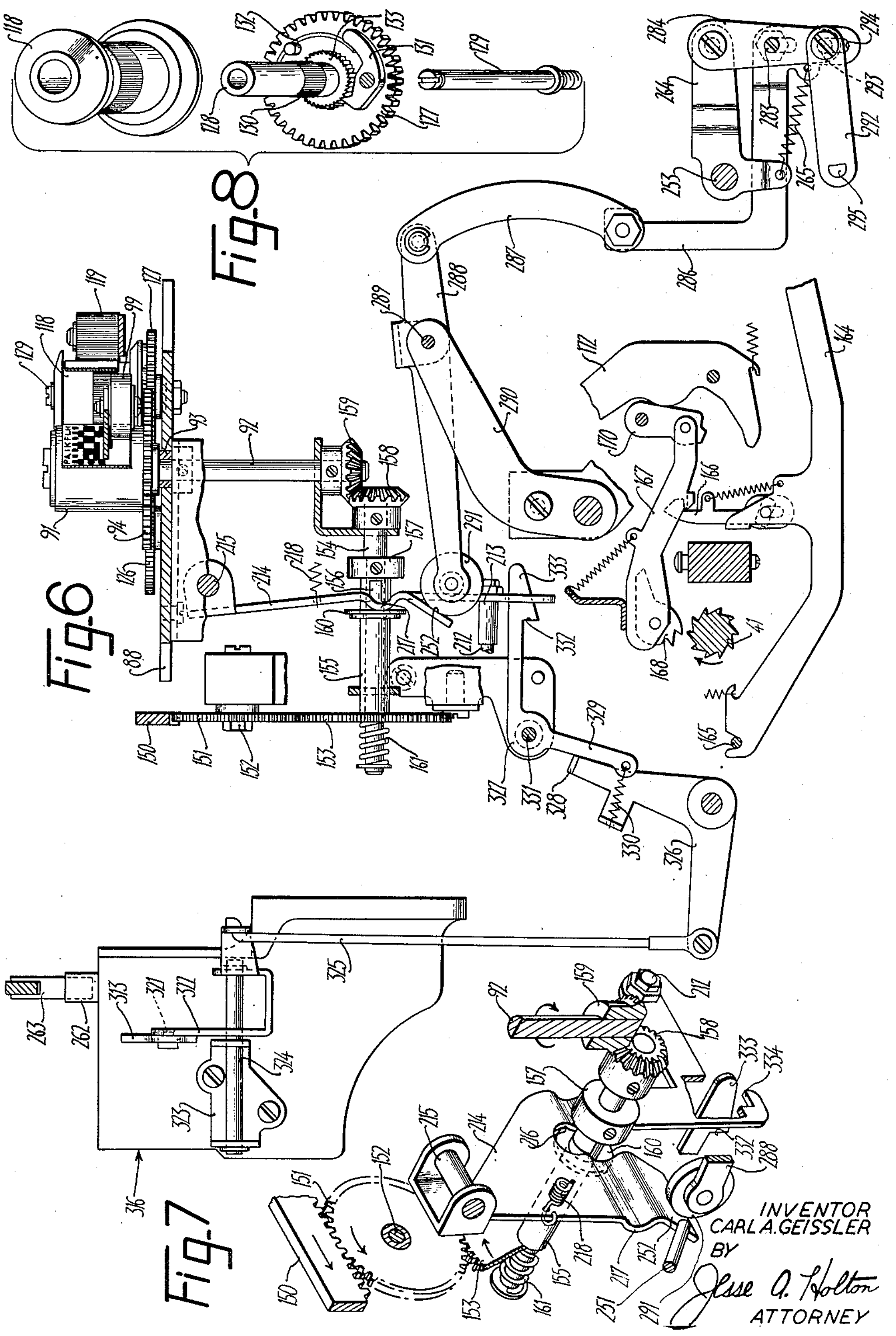
Figure 6 is a fragmentary side view, as if taken from the left side within the machine, showing some interior mechanisms for driving the tape and for controlling the tape drive.
Figure 7 is a left front perspective view of some of the driving and control elements of Figure 6, with parts broken away for clarity in illustration.
Figure 8 is an exploded perspective view of parts of a ribbon-driving capstan, shown in other views in Figures 6 and 1A.

A pressure roller 99 keeps the tape in frictional driving engagement with the surface of the capstan, and it bears on the tape in an area below any of the typed information, as seen in Figure 6, so that the record will not be rubbed or smudged. The pressure roller may be carried by one end of a bell crank 101, pivoted at 102 on the table and stressed as by spring 103 toward engagement with the tape on the capstan. The other end of bell crank 101 may be extended to form a handle piece 104 for releasing the pressure roller from the capstan when desired. A latching lever 105, urged upwardly by a spring 106, may be used to hold the pressure roller bell crank in disengaging position when the handle piece 104 is moved to pass beyond a shoulder 107 on the latch lever. Depression of the lever, as by a button 100 thereon, will release the handle 104 from the shoulder 107, and the spring 103 will turn the bell crank to restore the roller 99 to resilient engagement with the capstan.

After leaving the capstan, the tape passes behind the movable vertical end post or roller of a spring loaded yield arm 108 which cushions the inertia of the left hand reel when the tape is fed in reverse of normal. The pivot point for this yield arm may serve as the mounting for a final vertical guide post or roller 109, just before the tape is guided by the twisted strap 110 to the back side of the left-hand tape reel 33.

Figures 1B, 5:
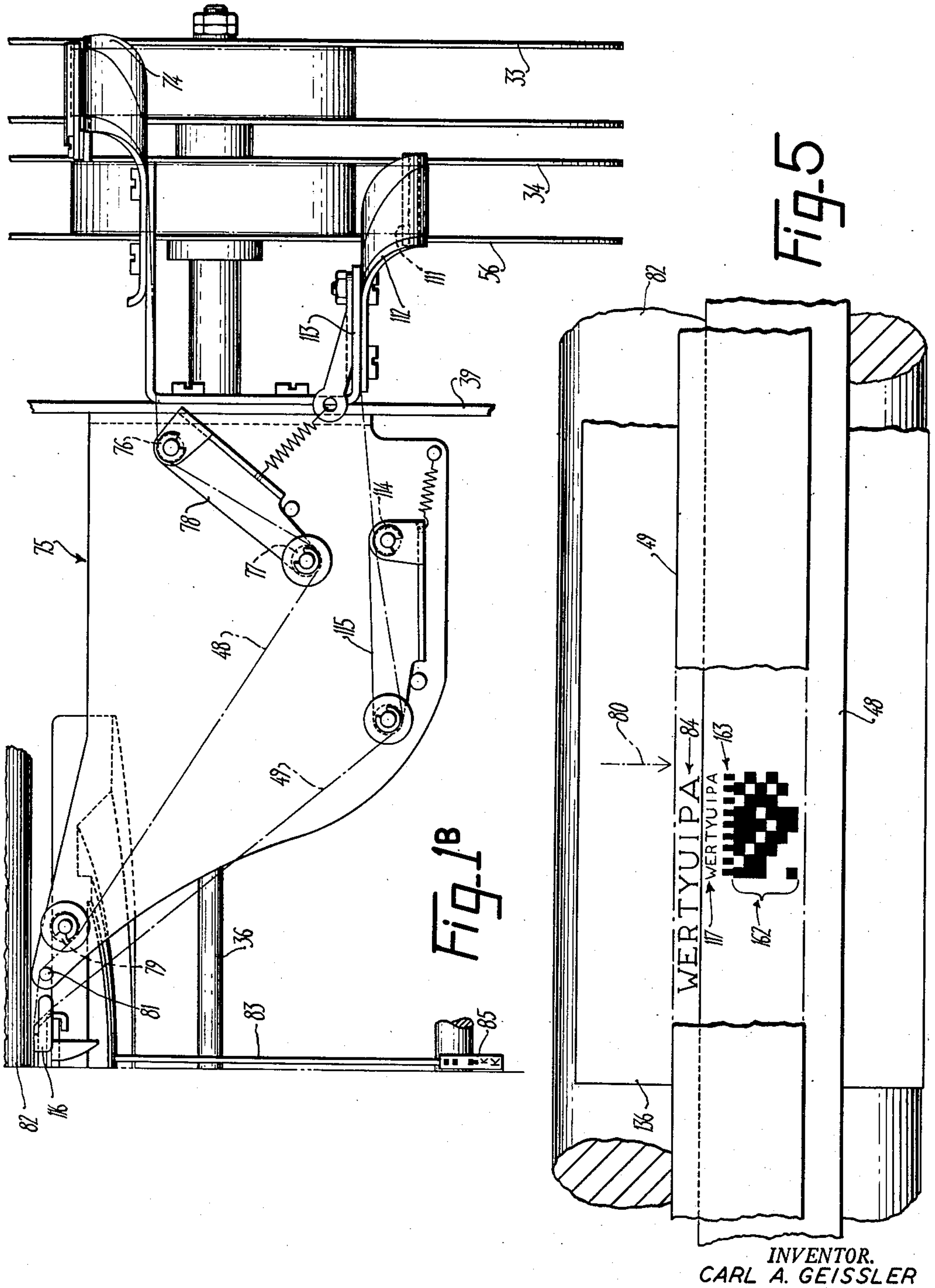
Figure 5 is an enlarged front elevation of the central portion of the platen of the machine, with fragments of a proof sheet, code record tape, and inking ribbon thereon in the relative positions they occupy immediately before a typing impression is made.

The ribbon supporting, guiding and feeding is similar to that for the tape, although ribbon lifting or vibrating is added, and the ribbon is always fed in a forward direction because it is a single-use carbon ribbon. Starting with the right-hand reel 34 of un-used ribbon 49, the ribbon is fed from the back of the reel, forwardly to the rearwardly curved bottom edge 111 of a polished, twisted tape guiding strap 112. Both the strap 74 and the strap 112, as shown, may be secured by a single bracket 113 to the side of the machine casing 39. Leaving the strap guide, the ribbon is threaded past a vertical post or roller 114, which may serve as the pivot for a spring loaded yield arm 115. The ribbon is passed in front of the movable vertical end post of arm 115 before going to the ribbon vibrator 116. This element is of conventional form, and as usual it guides the ribbon close to the platen past the printing point and vibrates to lift the ribbon to proper typing position during typing action and to lower the ribbon to expose the matter typed, when typing action is not taking place. Figure 5 shows the raised position of the ribbon. When lowered, the top edge of the ribbon is below the legible character 84 and also below the miniature character 117 when such a symbol is used.

After leaving the left-hand side of the vibrator-guide 116, the ribbon passes in front of a ribbon capstan 118, with a pressure roller 119 holding the ribbon against the surface of the capstan for frictional driving. The pressure roller 119 may be mounted on one end of a bell crank 121, pivoted at 122, urged by a spring 123, and with an extended handle end 124. By moving the handle, the pressure roller may be released from engagement with the ribbon on the capstan when the ribbon is being loaded on the machine. After leaving the capstan, the ribbon passes over a left-hand twisted guide 125, and over its rearwardly curved bottom edge to the back side of the used ribbon reel 34. The threading of tape and ribbon through or around the various guides and supports is shown by broken lines in Figures 1A and 1B.

The ribbon capstan 118 is driven from gear 94 of the tape capstan through an idler 126 which also engages a ribbon capstan driving gear 127, rotatably mounted on the lower end of a sleeve 128. Sleeve 128 is journaled on a vertical bearing post 129, suitably fixed on the platform 88. The capstan 118 is secured to the sleeve 128, as by a force fit which may include a knurled portion 130 on the sleeve, see Figure 8. Most of the time the gear 127 is driven in clockwise direction to drive sleeve 128 and capstan 118 clockwise on the post 129. Engagement of a clockwise directed ratchet 131, pivoted on the gear and pressed by spring 132 against a saw-tooth pinion 133, which is fixed to the sleeve 128, insures the proper locking of the sleeve and capstan with the gear for driving in that direction. However, when the tape gear 94 rotates in the opposite direction, driving the idler 126 clockwise and the ribbon gear 127 counterclockwise, the ratchet 131 rides over the teeth of pinion 133 so that sleeve 128 and capstan 118 do not rotate, being held in place by friction with the post 129 and pressure of the roller 119. This one-way drive of the ribbon insures that the ink coating of the ribbon will be used only once, even though the record tape may be back-spaced. The ratio between the size of gear 94 and the diameter of tape capstan 91 is made substantially the same as that between the size of gear 127 and the diameter of the ribbon capstan 118, to provide that both tape and ribbon will be driven in steps of approximately the same size. The tape stepping arrangement will next be described.

*Carriage and tape stepping*

One feature of the above mentioned Shaw application is to drive the carriage 135 in regular letter-spacing steps (about ten-pitch) while driving the tape in steps of about half that pitch size (about twenty-pitch). This is done so that the proof sheet 136 on the platen 82 will carry a legible record of the information being typed, and the other record, preferably coded, will be in greatly condensed form on the tape, where legibility gives way to saving of space. The tape drive of the present application is partially disclosed in the Shaw application, as a preferred form of drive of the general character desired in that invention. However, the specific mechanisms here disclosed are considered to be part of the present invention.

According to the present invention, the stepping drive of the tape obtains its motive power directly from stepping movement of the carriage through a train of mechanism so that by proper mechanical reduction of movement the desired ratio between the size of carriage spacing steps and the size of tape spacing steps is consistently maintained. Carriage spacing is obtained as usual, through an escapement rocker 138 (see Figure 14) which is rocked by a universal bar (not shown) in known fashion each time that a type bar action takes place, just as or immediately after the type head has struck the platen. The escapement rocker carries a pair of escapement dogs, a holding dog 139 and a stepping dog 140, with an interconnecting spring 141. As the rocker is moved from its normal stationary position, where a nose on holding dog 139 engages a tooth 142 on escapement wheel 143, the dog 139 swings downwardly to clear the tooth and allow the wheel to turn. This swings the stepping dog 140 temporarily into the path of the next wheel tooth, to interrupt rotation of the wheel. When the escapement rocker returns, the holding dog will intercept the wheel by the next tooth, the stepping dog meanwhile assuming again a position clear of the escapement wheel.

The escapement wheel is constantly biased by usual mechanisms, which include a spring motor with a draw band or strap 144 (Figure 9) fastened to the carriage at one end to bias the carriage leftwardly toward letter-spacing steps along a trackway 145, which is part of the framework of the machine. The bias on the carriage is transmitted to the escapment wheel through a carriage-supported rack 146 in mesh with a rack pinion 147, fixed to the upper end of a vertical shaft 148 which carries the escapement wheel 143 at its lower end. The assembly of pinion 147, shaft 148 and wheel 143 is suitably mounted in the machine framework to be rotated in one direction or the other by the rack 146 as the carriage is moved.

Figures 12, 14:
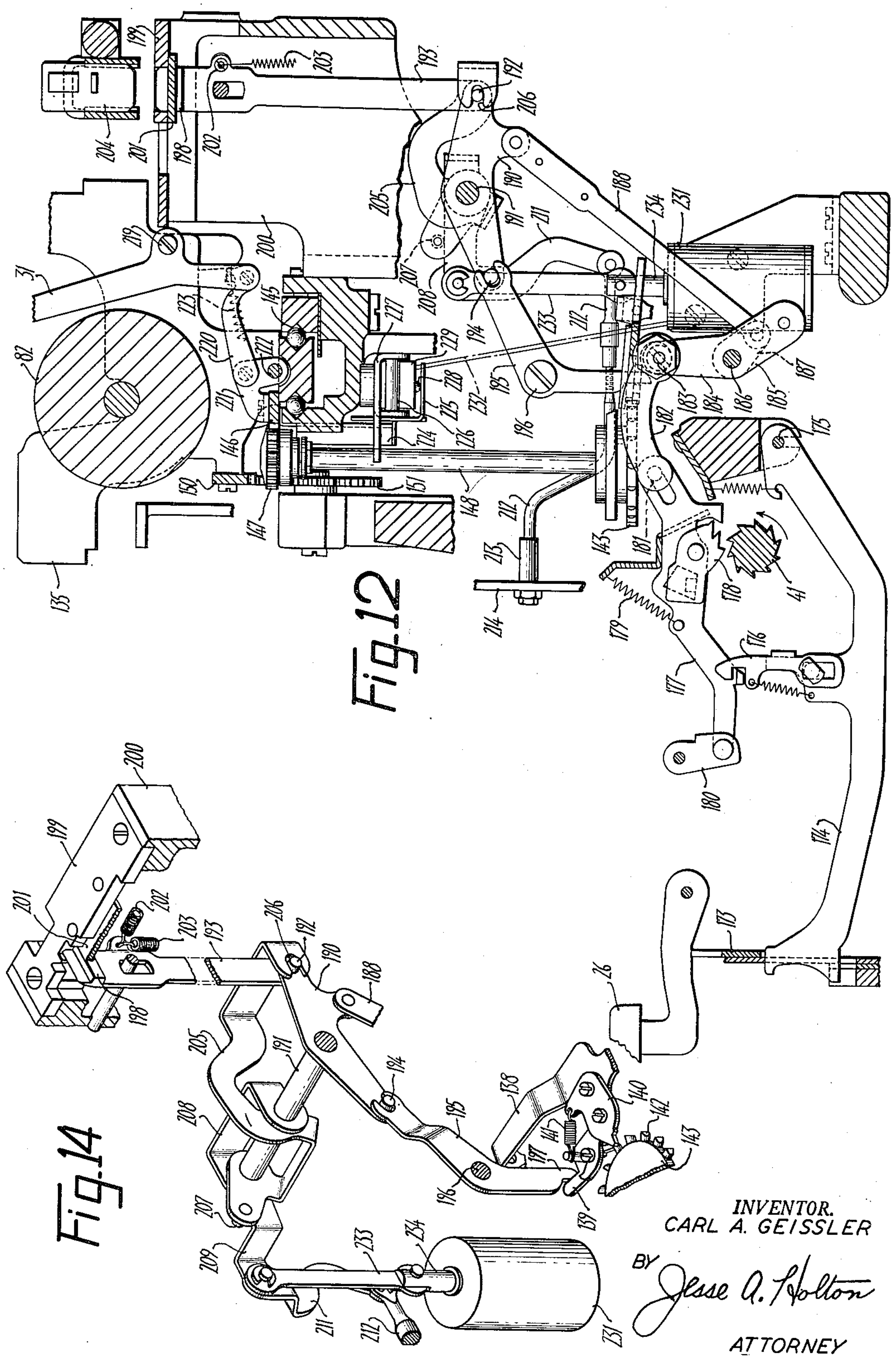
Figure 12 is a fragmentary side view, as if taken from the right side within the machine, showing linkages and mechanisms involved in stepping the carriage, in tabulating, and in carriage release.
Figure 14 is a right front perspective of some of the linkages and elements of Figure 12.

The tape drive is stepped with the carriage directly, through a tape driving rack 150 which is fixed to the carriage and extends along the length of the carriage. This is indicated in Figures 6, 7 and 12. In mesh with this rack is an idler reduction gear 151, suitably journaled as at 152 on a stationary part of the machine frame. This gear is adapted to engage and drive a main tape-driving gear 153, which is slidably mounted on a horizontal shaft 154. A clutch sleeve 155 is secured to the gear 153, and has ears 156 which slidably engage in corresponding notches in a clutch collar 157 secured to shaft 154. When gears 151 and 153 are engaged and the carriage is moved, rack 150 turns gear 151, rotating gear 153 and sleeve 155, and thereby turning collar 157 and shaft 154. Bevel gear 158 on the end of shaft 154, engaged with a matching bevel 159 on the bottom end of the capstan shaft 92, turns the tape capstan to drive the tape and ribbon as above described. Suitable journals and supports for the horizontal shaft 154 and the vertical shaft 92 are provided in fixed locations in the machine frame.

With this arrangement, as the carriage moves in a regular letter-spacing step, the tape capstan will be rotated a sufficient distance to drive the tape in a smaller step, the size of which is determined by the ratio between gears 151 and 153 and the diameter of the capstan. The tape driving steps are calculated to be about 20 to the inch, or twice as close together as the regular carriage spacing steps.

The sliding mounting of gear 153 and sleeve 155 on shaft 154 permits the tape drive to be broken when occasion demands. This is provided by a flange 160 secured to sleeve 155, and a spring 161 bearing against the outer face of gear 153 and anchored at its other end on an extension of the shaft 154. The spring normally urges gear 153 into meshing engagement with idler 151, to drive the tape. However, when pressure is applied against the flange 160 sufficient to compress the spring 161, the gear 153 disengages, and power is no longer supplied to the tape drive. Power is restored by spring 161 when it pushes gear 153 back into engagement with gear 151 after pressure is removed from the flange on sleeve 155.

*Normal typing action*

With the above described mechanisms in mind, the normal action of the machine during a typing cycle should be clear. However, it is explained that the type heads according to the companion Shaw application will carry not only a set of ten-pitch legible type characters 84, but also a set of twenty-pitch coded spots 162, representative of the type character carried by the same type bar. A smaller control spot 163 is aligned with the column of code spots within the twenty-pitch spacing, and this will be useful in a photoelectric reader or other device subsequently used to translate the code tape into information for machine use. The miniature character 117 previously mentioned, which may be read by eye only when a reading or magnifying glass is used, is also arranged within the twenty-pitch spacing in alignment with the legible character 84, on each type head where a legible character appears.

Figure 2:
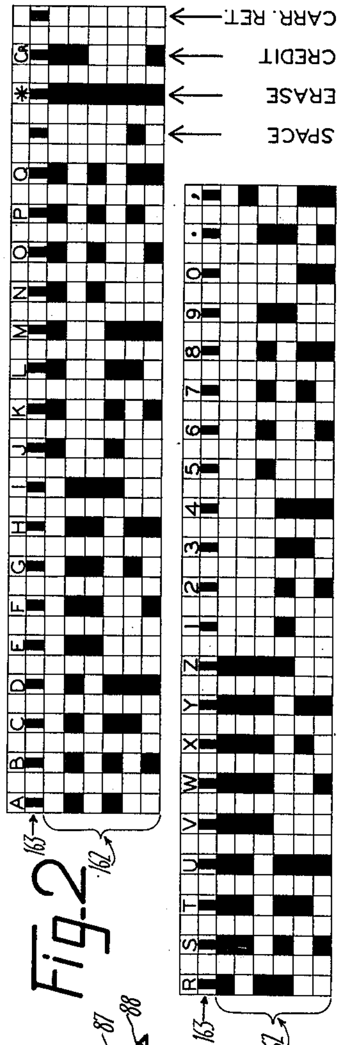
Figure 2 is a chart showing a spot-code which may be used on the type faces in this machine.
Figure 4:
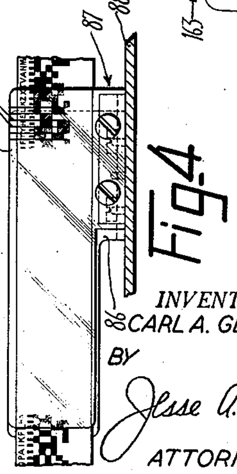
Figure 4 is a front elevation of a coded tape positioning scale, which is shown in plan view in Figure 1A as a part of the tape guiding structure.

The chart of Figure 2 shows one code which may be used on the type heads, together with the letter, figure, symbol or function which each code combination represents. A type bar with type head is provided for each code combination to be printed, and the above-described carriage stepping and tape stepping drives will space the legible characters 84 in standard letter-spacing steps on the proof sheet 136, while the miniature characters 117, the control spots 163 and the rows of code spots 162 will be spaced in twenty-pitch steps along the tape 48 as seen in Figure 5.

As shown in Patent 2,254,764—Yaeger, assigned to the present assignee, a typing action is started in the usual way be depressing a character key on one of the banks 21, 23, 24 or 25 of the keyboard. This lowers one end of a typical key lever 164 (Figure 6), pivoted on a pivot rod 165, pulling downwardly on a hooked link 166, which in turn pulls downwardly on a driving link 167. Driving link 167 carries a snatch pawl 168 which will then become engaged with the snatch roll 41, which drives the link 167, rocking a sub-lever or arm 170 against the curved rolling surface of a pivoted lever 172. Each lever 172 is connected at its top end to a type bar link (not shown) which swings one of the type bars 83 toward typing position.

The usual universal bar (not shown) is engaged by a portion of each type-bar just before the type-bar reaches the platen. This universal bar is used, as explained above, to actuate the carriage-feed escapement at the instant of type impact or immediately thereafter. The ribbon has been vibrated upwardly just before impact, and the type faces on the type head make their impressions on the proof sheet and code tape by striking through the raised ribbon. As the type bar returns to its rest position, the carriage-feed completes its spacing step, and the tape-feed consequently drives the tape and the ribbon in their smaller step, the gears 151 and 153 being in mesh.

From the code chart of Figure 2, it will be seen that, besides the alphabet, the ten decimal digits, a period and a comma, extra code combinations and symbols are provided for "Erase" and for "Credit" (CR). The "Erase" symbol will obliterate a conventional character previously typed, and the code for this symbol covers all the possible code positions to blank out anything previously typed in error, or which it is desired to remove from the coded record. The "Credit" symbol and code have uses in later machine-handling of the information. Both of these codes and symbols use standard keys and type actions, and their type heads are similar to those of the alphabetic and numeric characters.

There is a "Space" code, but no legible symbol for this function. Therefore, the usual space bar 22 is connected to a key lever to actuate a type bar, as in typing a character, but the type head on this bar carries only a code which is printed on the tape. A blank space in the usual legible character location on this type head will result in a blank space on the legible proof sheet record. Because a type bar has been actuated, the usual letter-spacing steps will take place on carriage and on tape.

In cases where it is desired to space the carriage and tape in their usual steps without typing the "Space" code on the tape, as when spacing over matter already typed, or when producing a truly blank space on both the proof sheet and tape, the "Tape Advance" (TA) key 30 is used. This may be connected to the usual space bar stepping mechanism, which will not actuate a type bar but will step the carriage and therefore step the tape and ribbon, or it may be connected to a dummy type action with a type bar having nothing on the type head. In either case the result is a stepping action of the carriage and tape, with no printing on either proof sheet or tape.

*Tab key action*

The tab key action is typical of certain functional operations of the typewriter which produce movement of the carriage but desirably do not result in any movement or stepping of the tape. If a space or code is desired to be placed on the tape for the Tab function, there may be assigned an extra character key, type-bar and code for printing a tabulating symbol. However, it is undesirable to move the tape along with the carriage during tabulation action, because of the variable length of tabulation settings and the wasted tape and ribbon areas if the tape were driven during such tabulation. Therefore, in the exemplary machine, actuation of the Tab key 26 is intended to be preceded or followed by operation of the TA key, or the space bar, or an extra tabulation code-typing key if an extra typing mechanism can be spared. This will produce a single space on the legible proof sheet, and a single space or a code on the tape, depending upon the key used. Naturally no tabulating action accompanies the use of such a spacing or extra tabulation coding key.

When the Tab key is depressed, the usual tabulating action of the carriage will take place by known mechanisms, for example, by those shown in Patents 2,303,877 or 2,303,878—Helmond, assigned to the present assignee, but the tape drive must be disconnected from the carriage before this action takes place and must be recommended after tabulating.

Figure 12 and Figure 14 show arrangements added to a standard tabulating mechanism to accomplish this. When tabulating, pressure on the Tab key 26 works a slide 173, which in turn depresses one end of a tab key lever 174, similar to the character key lever 164 of Figure 6. A pivot 175 for the key lever allows a hooked link 176, carried by the downwardly moving lever, to pull downwardly on a driving link 177 until a snatch pawl 178 on the driving link engages the power driven snatch roll 41. The snatch roll will then drive the link to the left as seen in Figure 12, against the bias of a spring 179. A pivoted sub-lever or arm 180 supports and guides one end of the link 177 in its movement.

The other end of driving link 177 has a slotted pivotal connection 181 with an actuator link 182, pivoted at 183 to the upwardly extending arm 184 of a bell crank 185 fixed on a rockshaft 186. This shaft 186 has an arm 187 also fixed thereto, so that as the shaft is rocked, a link 188, pivoted at one end to arm 187 and at its upper end to a rocker 190, is lifted to turn the rocker 190 counterclockwise about a bearing on a pivot rod 191. The rear end of rocker 190 is pivotally connected at a pin 192 to the tabulator stop blade 193. A forward arm of rocker 190 carries a pin 194 arranged in a slot in an arm of a bell crank lever 195, suitably journaled in the machine as at 196. The bell crank lever has a depending arm with a tip 197 adapted to engage a tail of the pivoted holding dog 139 of the carriage escapement mechanism.

Rocking of shaft 186 by the power drive of driving link 177 raises blade 193 and at the same time rocks bell crank 195 to move dog 139 out of holding engagement with the teeth of escapement wheel 143 and thus disable the escapement control and permit the carriage to be moved toward the left of the machine under influence of the spring-driven draw band 144.

The blade 193 has near its upper end a small block 198, which enters a guide hole in the top plate 199 of a tabulator frame or magazine 200, as the blade is lifted. The top plate underside has a small catch block 201 projecting beyond the edge of the guide hole where the blade end rides, so that when the blade is raised a spring 202 will flex the blade, and the block 198 will be swung to rest on the ledge provided by block 201 and also engage the top plate at the edge of the guide hole. This will provide a latch against return of the blade by its spring 203 and will present a resistance to the tabulating stop action of the carriage when it is moved by the usual spring motor and draw band 144.

When the carriage banks one of its set tabulating stops 204 against the stop blade 193 it unlatches the blade, and the downward movement of the same by its spring 203 raises the forward arm of rocker 190, releasing the tip of bell crank 195 from the tail of the holding dog 139, allowing the dog to be reintroduced to the teeth of escapement wheel 143 by spring 141. This stops movement of the carriage at the set stop, the rest of the tabulating mechanism being restored to initial position by action more fully described in the Helmond patent mentioned above.

The mechanism added to this tabulating action in order to stop the tape drive includes an S-shaped rocker 205 freely pivoted on pivot rod 191. One end of this rocker is slotted at 206 to straddle pivot pin 192, which also lifts the tabulator stop blade. The other end of the rocker has a projecting pin 207 which bears against the top edge of an arm 209 on a second rocker 208, also freely pivoted on pivot rod 191. Rocker arm 209 projects forwardly from pivot rod 191, and this arm has a portion 211 projecting downwardly from its end. Thus, as the tabulator stop blade is lifted by pivot pin 192, this pin tilts rocker 205, in turn depressing arm 209 and moving the lower end of portion 211 downwardly and rearwardly of the machine. Pivotally connected to the lower end of portion 211 is a pull-rod 212, suitably secured by a flexible connection 213 to a swinging tape clutch control plate 214. Rearward motion of pull-rod 212 will pull the plate.

The plate 214, as seen most clearly in Figures 6 and 7, is pivoted as at 215 under the table 88 of the machine, and has a slot 216 which straddles the shaft 154 and sleeve 155 next to the clutch control flange 160 earlier described. Curved bearing surfaces 217 on the plate 214 opposite the flange 160 insure smooth action when the plate 214 is swung against the flange to interrupt the tape drive by throwing gears 151 and 153 out of mesh.

Obviously, when pull-rod 212 moves the clutch control plate 214 to interrupt the tape drive, the tabulator stop blade 193 has at the same time, or just previously, been raised. This all occurs just before the release of holding dog 139 from the carriage escapement, the proper timing being obtained from natural lost motion in the various linkages. Therefore tape motion and consequent ribbon motion will not take place while the tabulating stop blade is raised, or during the entire tabulating cycle. However, as soon as the stop blade is lowered, terminating the tab cycle, the linkage leading to the tape clutch control plate will move in reverse direction, aided by a spring 218 which biases the control plate in a direction away from the flange 160, and the clutch spring 161 will reengage the gears 151 and 153 to restore normal tape driving connections.

*Carriage release action*

Another functional operation of the machine which may result in carriage motion which is not to be transmitted to the tape drive, is the usual carriage release, governed by actuation of the carriage release lever 31, pivoted to the carriage at point 219 (see Figure 12). As is normal, the end of release lever 31 below its pivot point carries a link 220, pivotally connected at one end to the release lever and at the other end to the elbow of an L-shaped carriage rack lifter 221. One end of the lifter is pivoted on the carriage at 222. The other end of the lifter is secured to the top face of carriage rack 146, above described. A biasing spring 223 normally holds the carriage release linkage in position so that the carriage rack will mesh with the teeth of rack pinion 147, putting movement of the carriage under control of the escapement mechanism. To release the carriage for movement free of the escapement, the release lever is moved forward (to the left, in Figure 12), rocking the rack lifter and disengaging the rack from the pinion.

Figure 13:
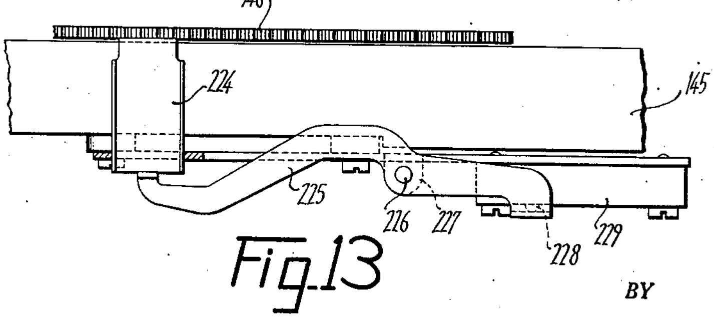
Figure 13 is a fragmentary front elevation view of a switch operating linkage used in the carriage release.

To this known mechanism, the tape drive locking arrangement is added, so that whenever the carriage is released, the tape and ribbon will not be driven by subsequent motion of the carriage. At a suitable place on the interior machine frame, appropriately under the path of movement of the carriage rack on an outer face of the trackway 145 for the carriage, a control slide 224 is mounted for vertical sliding movement, in a shallow groove or slot provided for that purpose. The top end of the slide may be bent over the top surface of the trackway as shown so that the slide will not drop out of the groove but the slide may be lifted to slide upwardly in the groove. Figures 12 and 13 show the bottom end of the slide 224 extending below the trackway and resting on a flat end of a switch lever 225, which is pivoted intermediate its ends, at 226, on a suitable bracket 227 carried by the machine frame. The other end of lever 225 is bent to extend over the button 228 of a miniature push-button snap switch 229, also suitably mounted on the frame.

Normally, the weight of the carriage rack and the slide 224 are sufficient to hold down one end of the lever 225 and to push up on the other end of the lever with enough force to move the button 228 inwardly of the switch against the built-in inner spring bias of the switch. In this condition, the switch is designed to open a circuit therethrough, but upon release of the button, its spring (not shown) will not only push the button outwardly but will also close the circuit through the switch.

The linkage system is so designed and balanced that when the carriage rack is lifted away from the slide by movement of the carriage release lever 31, the weight of the slide 224 and the lever 225 is not enough to overcome the internal spring pressure on the button, so the button will be pushed outwardly, the lever will be rocked, the slide will lift, and the switch circuit will close.

Closing of the switch 229 will provide a solenoid 231 with energy, through appropriate wiring connections shown by the double broken lines 232 in Figure 12. This solenoid is fixed to the machine frame directly under the angle formed between the forward arm 209 and the downward portion 211 of rocker 208. A pull-link 233 connects the movable armature 234 of the solenoid with the angle on arm 209, so that when the solenoid is energized the armature and link 233 will be pulled, the rocker 208 will turn counterclockwise free of the pin 207 or other influence, and pull on the clutch control rod 212 to disconnect the tape drive as explained earlier. Thus, actuation of the carriage release lever to free the carriage will result in disconnecting the tape drive if the power control switch is On.

*Motor control switch action*

It is customary in many electric typewriters to have a power control switch which is used to cut off power to the machine and to provide certain interlocks which function when the machine is not in use but remains connected by a cord set to a power source. Such a switch is disclosed in Patent 2,366,107—Helmond, mentioned earlier.

Figures 9, 10, 11:
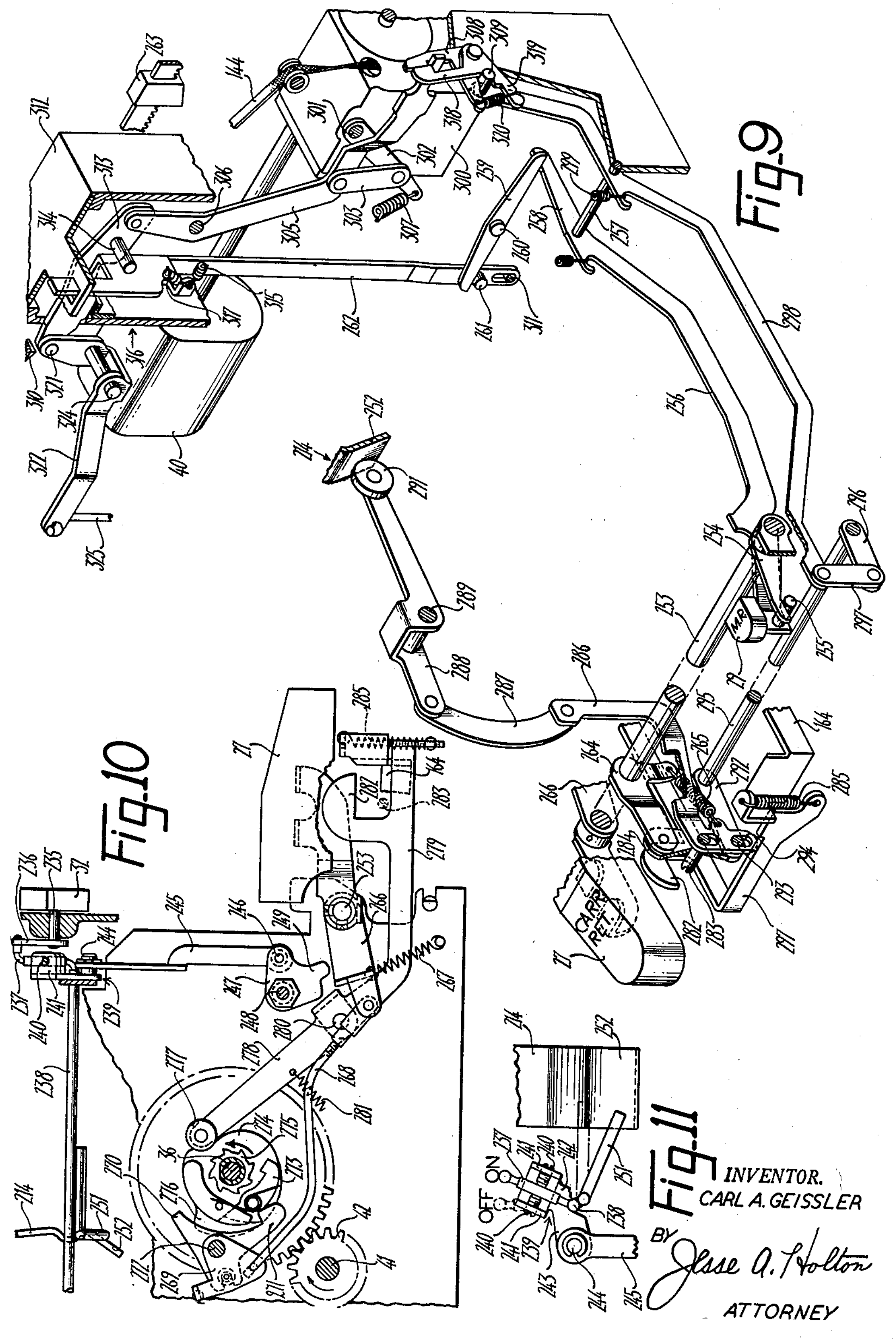
Figure 9 is a right front perspective view showing control linkages and other mechanisms involved in a carriage return operation.
Figure 10 is a fragmentary side view, as if taken from the left side of the machine, showing other parts involved in the carriage return, and parts of the motor control switch mechanism.
Figure 11 is a front view, minus the control knob, of parts of the motor control switch mechanism shown in side view in Figure 10.

As seen in Figures 10 and 11, the switch has a control knob 32 which is fast upon a stub shaft 235, protruding from and pivoted in the front of the machine casing at one side of the keyboard. Movement of the knob between the On and Off positions indicated in Figure 11 will actuate a tumbler or snap switch (not shown) which is arranged in the usual circuit leading to the electric motor 40 which powers the machine. The solenoid 231 is also in this circuit. Switch actuation is obtained through a slotted disc 236 secured to the stub shaft 235, into the slot of which a crank end 237 of a fore-and-aft shaft 238 extends. The other end of shaft 238 has operating connection to the motor control switch in a manner more fully described in the Helmond patent.

The switch knob in the present case also locks the machine against actuation of the carriage return key and disconnects the tape drive when power is turned Off. A bell crank 239 is suitably secured to turn with shaft 238, as by a connection including the adjustable set-screws 240 which bear on either side of the crank end 237 and are threaded into ears 241 on the arm 242 of the bell crank which is next to the crank end 237. The other arm 243 of the bell crank extends generally horizontally and has pivoted thereto as at 244 a depending push link 245. The bottom end of link 245 is pivoted at 246 to a rocking lock member 247, journaled at 248 on the machine frame just above a portion of the carriage return key action which will be later described. A locking nose 249 on the member 247 will be moved into position to block movement of the carriage return key linkage when the link 245 is dropped by turning switch knob 32 from On to Off position.

Interruption of the tape drive by turning the switch knob is accomplished simply through a control shaft extension 251, brazed, welded or otherwise suitably secured to the fore-and-aft shaft 238, with a free end projecting near a slanted surface 252 on the bottom end of the tape clutch control plate 214. When the switch knob is in the On position, extension 251 lies against a lower portion of the slanted surface 252. However, when the switch knob is turned to Off position, extension 251 is raised to push against surface 252 and thereby move the control plate 214 toward the position in which it disengages gear 153 from gear 151 in the tape drive as above described. Thus, no actuation of the tape drive from carriage movement can be obtained when the switch is Off.

*Carriage return action*

It is preferred in this machine to use a power operated carriage return mechanism which is combined with a line-spacing device, so that line-spacing always accompanies a carriage return action, and repeated line spacings will be obtained by a series of repeated depressions of either of the carriage return keys 27. Basically, the carriage return and line spacing mechanisms of the present machine are adapted from those of Patent 2,541,295—Sagner, assigned to the present assignee. For a full understanding of details of these mechanisms and their actions, reference may therefore be made to that patent.

However, the instant machine preferably has devices added to the carriage return action, which produce in turn, (1) margin release, (2) typing of a code on the tape and advance of the tape by one step before carriage return starts, (3) disconnection of the tape drive, (4) return of the carriage only after the tape drive has been disconnected, and (5) reconnection of the tape drive after completion of the carriage return. Timing of the various steps is of extreme importance if all of them are to be accomplished by depression of a single key, rather than by successive depression of two different keys as in the case of the tabulation action described earlier. Parts involved in this action are shown in Figures 6, 9 and 10.

When either carriage return key 27 is depressed, a rockshaft 253, to which the levers of both keys are secured, will be turned. A forwardly extending finger 254, also secured to the rockshaft and overlying a pin 255 on the lever 256 under the margin release (M-R) key 29, will also be turned to depress that key and actuate the usual margin release mechanism. This is done so that if the carriage is resting against a margin stop when the carriage return key is struck, the carriage will be freed to move in the single step necessary for typing the carriage return code on the tape and for spacing the tape following that typing action.

When the M-R key 29 is depressed, either directly or through action of the rockshaft 253, the margin release key lever 256 will swing about a pivot on a pivot shaft 257, raising the far end 258 of the lever, tilting a margin stop actuator 259 about its pivot 260. The actuator engages over a pin 261 on the lower end of the margin stop blade 262, to pull the top end of the blade out of the path of movement of an adjustable margin stop 263, suitably mounted on the carriage. This mechanism is well known, although its connection to the carriage return key is not.

The typing action is next. As the key 27 is depressed, turning shaft 253, the forwardly extending lever guide arm 264, pivoted freely on the shaft, is not yet moved, but waits for a time delay necessary for completion of the margin release and code typing actions. A spring 265, acting between the arm 264 and another part of the mechanism holds this arm and connected parts stationary while the delay takes place.

Depression of either carriage return key does, however, turn and raise a rearwardly extending arm 266, which is fixed to the shaft 253. A spring 267 biases arm 266, shaft 253 and the carriage return keys toward their normal non-actuated positions. Arm 266 is the member against which the rocking lock member 247 will be pressed, to lock the carriage return mechanism when the motor switch is turned Off, as above mentioned. The far end of arm 266 pivotally carries one end of a rigid push-wire 268, which in turn is pivotally connected to an intermediate member 269 constituting part of a control dog 271, suitably pivoted as at 272 on one side of the machine frame or casing near the power shaft 41 and the reel shaft 36. Control dog 271 governs action of a single revolution cam drive, and including a spring-biased driving dog 273 pivoted on a cam 274 which is freely journaled on the reel driving shaft 36. Control dog 271 normally engages a shoulder on driving dog 273 to hold this second dog against its spring bias and move it away from engagement with a saw-tooth pinion 275, keyed to shaft 36. The inter-engagement of the dogs also holds cam 274 normally stationary while shaft 36 is rotated.

When dog 271 is released from dog 273 by depression of key 27, the cam 274 is released, dog 273, urged by its spring, engages the turning pinion 275, and the cam is locked to and driven by the shaft. Normally, if the key 27 is released before the cam returns to its starting position, the dogs 271 and 273 will reengage and thereby disconnect dog 273 from the pinion 275, stopping the cam at the starting position. If the key is held depressed, while dog 273 passes the tail end stop shoulder 270 of dog 271, the stop shoulder 270 will engage the latching shoulder on 273, disengaging the dog 273 from the pinion 275 and holding the cam against further rotation until the key is released. When released, the spring on dog 273 and the bias on arm 266 will pull the dog 273 out of engagement with the tail shoulder 270, reengaging the dog 273 with pinion 275 long enough for it to go to its starting position and be stopped as above explained.

Cam 274, in its revolution, provides a time delay for the margin release to operate before the type action starts, and this cam also provides the driving power for initiating the typing action and the carriage return. Cam 274 has a raised track portion 276 as well as the slight dwell where the roller 277 on the rear arm 278 of a rocker 279 will ride. The roller on the rocker will be biased about its pivot 280 by a spring 281 toward the track of cam 274.

As the cam rotates and starts to lift the roller as it progresses toward the higher portion of raised surface 276, arm 278 will be raised to tilt rocker 279 so that the forward portion of the rocker will move downwardly. A hook 282 on the rocker will then start to approach a stud 283 projecting through a hole in a vertical link 284 which pivotally depends from the lever guide arm 264. However, before the hook engages the stud, the forward end of rocker 279, spring-connected as at 285 to the end of a particular one of the key levers 164, will start the typing action for the carriage return code. This action continues as described above under Normal Typing Action, to type the code on the tape, and space the proof sheet and tape one step. The spring connection allows over-travel between arm 279 and the key lever 164 which has been selected in advance for use in typing the code for carriage return.

As the hook 282 continues to be driven toward stud 283 by the rise on cam 274, there will be sufficient time for the typing action to be completed, and when the hook engages the stud it will start to push link 284 downwardly and do two things simultaneously. First, in terms of ultimate action, stud 283 will start to pull downwardly on a Z-link 286, to which the stud may be adjustably secured as by a slot and set-nuts as indicated. Z-link 286 is pivotally connected at its upper end to another link 287, which hangs pivotally from one end of a roller-rocker 288 pivotally supported as at 289 in a bracket 290 secured in the machine frame. The other end of rocker 288 carries a roller 291 which normally lies opposite the low portion of slanted surface 252 of the pivoted tape clutch control plate 214 earlier described. When stud 283 moves downwardly by the action just outlined, roller 291 moves upwardly over surface 252 to swing plate 214 to tape-drive disengaging position, thus stopping the tape drive.

The second action started by downward movement of the stud 283 is by depression of an arm 292, which has a pivot pin 293 extending through a pivot hole in link 284, and also engages in a slot 294 in Z-link 286. The Z-link and the link 284, being adjustably tied together by stud 283 and pin 293 in their respective slots, will operate as a unit. At the beginning of movement of stud 283 and link 284, the arm 292 will start to move immediately, turning the rockshaft 295, to which arm 292 is fixed. As shaft 295 is rocked, the carriage return cycle will start to take place.

Forwardly extending arm 296, fixed to turn with shaft 295, has a vertically extending connection link 297 pivoted thereto, and this link is pivoted at its upper end to the front end of a rearwardly reaching lever 298 having a fulcrum on the pivot shaft 257. A spring 299 serves to restore this lever upwardly to normal position when its front end is not depressed.

The movement of lever 298 controls carriage return through a clutch mechanism (not shown) inside of transmission housing 300. A shaft 301, extending from the transmission, carries an arm 302 which has a connection, as by a link 303, with a clutch control lever 305. This link is pivoted at 306 and a spring 307 connected to arm 302 constantly urges this linkage in a direction to turn shaft 301 toward a closed clutch position. Normally, however, a primary latch 308, pivotally supported in the right side wall of the machine, keeps the lever 305, against the tension of spring 307, in a clutch-opening position. The latch 308 is released by upward motion of a pin 309 on lever 298, underlying a forwardly reaching arm of the latch. When the latch is rotated clockwise by the rising pin, it frees lever 305 for clutch closing movement under tension of the spring 307. This renders the carriage return and line-spacing drive active, as shown in the mentioned Sagner patent.

At the conclusion of each carriage returning operation the clutch in transmission 300 is automatically opened through a swinging displacement of the margin stop blade 262 rightwardly by the left-hand carriage return terminating margin stop 310. The stop blade for this purpose is mounted to swing about its lower end on a pivot pin 311 and at its upper end has capacity for a limited swinging movement in the direction in which the carriage extends, projecting through a guide hole in a plate 312, forming part of the machine frame or housing. The connection between the stop blade 262 and the control lever 305 consists of a link 313 extending leftwardly from an upper arm of lever 305, the link having a pin 314 contacting with the stop blade. Normally the blade is biased to the right, against the right edge of its guide hole in the plate 312 and against the pin 314, by spring 315, but in the closed clutch position of the lever 305, pin 314 pushes the top end of the blade to the left, toward the left edge of its guide hole. Incidental to its rightward displacement by the margin stop 310, the stop blade will displace the lever 305 a little beyond the open clutch position so that the latch 308 will resume control.

The link 313 is guided near its left end in the housing 316 and is extended outside the housing to perform additional control for the tape drive mechanisms to be later described.

The stop blade 262, besides the spring 315 which keeps the blade in contact with pin 314, has an upwardly acting spring 317 to keep the upper end of the blade normally in cooperative range of the margin stops, the blade at the location of the pivot pin 311 having a slot permitting it to be lowered below the range of the margin stops, for typing beyond the regularly established margins as explained above in connection with the margin release action.

Pivoted on the same pivot as the latch 308 is a secondary latch 318 normally clear of the front side of the lever 305 and having a latch shoulder located a little lower than the latch shoulder of 308. This secondary latch has an arm 319 reaching forwardly under and normally contacting pin 309 under tension of a spring 320 provided between the primary and secondary latches. When the primary latch is operated by movement of the pin on lever 298, the secondary latch is temporarily enabled under the tension of the spring 320 to hold the lever 305 as it moves to open clutch position and in the event that the carriage return operation is completed before lever 298 has been released. In any event, following release of the lever 298, and at the end of the power return of the carriage, the primary latch 308 will always have reassumed control over the lever 305, under the tension of spring 320, to hold 305 in open-clutch position.

In order to insure that the tape drive remains disconnected throughout the entire carriage return operation and is reconnected only when return is complete, the portion of link 313 which is extended through the housing 316 is pivotally connected at 321 to the short arm of a bell crank lever 322. A bracket 323 secured to the housing supports a horizontal rockshaft 324 on which the bell crank is journaled.

The longer arm of the bell crank has a connection link 325 pivoted thereto, which at its lower end is pivotally connected to one arm of a second bell crank 326, suitably journaled in the machine frame. The other arm of bell crank 326 is positioned to cooperate with a clutch plate latch 327 by a bent end or shoulder 328 on crank 326 which bears on a depending arm 329 of the latch, and a spring 330 which normally holds the bent end and the arm in engagement with each other, but will permit movement of the arm away from the bent end.

Latch 327 is pivoted as at 331 in the frame, and has a latching shoulder 332 on its forwardly extending arm 333. This arm passes freely through a latching hole in the clutch control plate, and when the plate is moved to its fullest tape-drive disconnecting position, the shoulder 332 will ride over the bottom edge 334 of the latching hole and latch the plate in that position. The machine is designed so that control plate 214 is not moved to this full, latched position excepting when it is moved by the roller 291 of the carriage return action. Other movements of the plate by the other means shown, will disengage the tape drive but will not move the plate sufficiently to reach the latch position.

Therefore, when the tape drive is stopped through action of the roller 291 at the beginning of carriage return, the tape drive will remain disconnected from control by the carriage until the left-hand margin stop 310 on the returning carriage strikes the tip of stop blade 262, thereby moving link 313 and control lever 305 to disconnect the power return of the carriage. As link 313 is thus moved, it rocks bell crank 322, lifting link 325 and tilting the second bell crank 326 so that its bent end rotates latch 329 sufficiently to remove shoulder 332 from the bottom edge of the hole in the clutch control plate. The spring 218 on the plate, as well as the spring 161 on the gear shaft 154, will then swing the plate forwardly and the tape driving gears will become engaged again. Roller 291 will not prevent this action because it will previously have been released upon completion of the driving cycle of the cam 274 which started the carriage return action.

Carriage return is now complete, and the machine is ready for typing the next character or code, although the tape has been driven only the single step necessary for typing the carriage return code.

*Back space action*

Structure for back spacing is not shown here because it may be of any convenient kind for example, as shown in Patent No. 2,294,662—Helmond, assigned to the present assignee. It is enough to note that no character or code is typed during this action, and that the tape as well as the proof sheet will be spaced rearwardly a step at a time during the carriage back-spacing action because the tape drive remains engaged. The ribbon will not be back-spaced because of the one-way clutch on the ribbon capstan.

After a long series of back spacing steps, or when a previously coded tape is for some reason repositioned in the machine so that the vertical rows of code dots are not precisely located opposite the printing station, the tape positioning scale 87 is used. When the machine is built, the vertical lines 90 on the transparent front of the scale are adjusted so that each line is an exact distance away from the printing station such that if columns of code spots on a tape are centered between the lines, the portion of the tape opposite the printing station will be in the exact proper position for typing a succeeding code.

In order to free the tape for making such adjustment, or for moving the tape long distances forward or backward without operating the machine, the tape drive pressure roller 99 may be released, and the tape may be moved by turning one or the other of the tape reels. Ribbon adjusting movement is accomplished in a similar manner following release of the ribbon drive pressure roller 119.

*General action review*

It will be seen that, by the train of mechanism directly coupling the carriage and the tape driving capstan, and by the tape clutch control which disconnects this driving train upon actuation of any one of the several carriage controls which permit or produce carriage movement of more than one step, most of the objects of the present invention are accomplished. Because the tape drive is coupled directly to the carriage, the tape is moved only when the carriage is moved, and in steps directly related in size to the carriage steps. Every key action which requires typing or spacing on the tape in either direction results in stepping the tape only one space at a time. However, whenever the carriage movement, due to key action or release of the carriage, may be more than a single step at a time in either direction, the tape drive control, through the key action or through release of the carriage, disconnects the tape drive train so that the tape is not moved.

Provision is made for precise positioning of characters with relation to each other on the record tape, in addition to the direct drive from the carriage. This positioning mechanism also holds the tape stationary when the drive is not being used. Because the ribbon drive is coupled directly with the tape drive by means including a one-way clutch, the ribbon will be moved like the tape, forwardly in single steps only, but will not move in any reverse steps even though the tape may do so.

Maximum use is made of mechanisms now provided in standard machines, so that manufacturing costs are kept down. The keyboard and other controls also differ but little from those of standard machines so that a specially trained operator is not needed. In spite of this, the machine will produce two separate records of information in different forms, not possible with the former machines whose mechanisms were adapted to the present invention.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In a typewriter of the class having a keyboard, a carriage movable in longitudinal steps, a platen on the carriage for holding and moving a record sheet in steps past a printing station as the carriage steps, pairs of types faces actuated from the keyboard one pair at a time to produce successive typing impressions through a ribbon at the printing station and stepping of the carriage, one face of each successive pair impressing through the ribbon a step by step record on the record sheet, and the other face of each pair impressing through the ribbon a corresponding separate record on a horizontal tape overlying a portion of the record sheet and guided past the printing station, that improvement for driving the tape and ribbon past the printing station in steps smaller than the steps on the platen-held record sheet comprising, a rotatable tape-driving capstan on the machine, means holding the tape against the capstan for movement therewith, a ribbon driving capstan, means holding the ribbon against its capstan for movement therewith, a train of gears between the tape and ribbon capstans and a one-way clutch preventing movement of the ribbon capstan in one direction, and a train of mechanism directly connecting the tape capstan to the carriage and converting longitudinal stepping movement of the carriage into smaller turning step movement of the tape capstan, to move the tape in small steps in either direction past the printing station as the carriage moves in larger steps, but moving the ribbon in one direction only.

2. In an electric typewriter of the class having a keyboard, a carriage power driven in longitudinal steps, a platen on the carriage moving in steps past a printing station as the carriage moves, type faces actuated from the keyboard one at a time to produce successive typing impressions at the printing station and stepping of the carriage, and said machine having a horizontal tape lying next to the platen and guided past the printing station for receiving typing impressions, that improvement for driving the tape in steps past the printing station comprising, power driven friction means maintaining a constant light tension on the tape balanced on either side of the printing station, means overcoming the tension balance to drive the tape including a rotatable tape-driving capstan on the machine, means holding the tape against the capstan for movement therewith, and a train of mechanism directly connecting the capstan to the carriage and converting longitudinal stepping movement of the carriage into turning step movement of the capstan, to overcome the balanced tension and move the tape in steps past the printing station as the carriage moves.

3. In a typewriter of the class having a keyboard, a carriage movable in horizontal longitudinal steps, a platen on the carriage moving in steps past a printing station as the carriage moves, means actuated from the keyboard to produce single space stepping of the carriage platen and typing impressions at the printing station, and a carriage return control producing backward platen movement greater than a single space step, that improvement in guiding and driving an impression receiving record tape horizontally past the printing station on the platen in single forward steps only, comprising, a driving element on the carriage, tape guides directing an impression receiving record tape horizontally past the printing station, a tape driving capstan vertically journaled adjacent the printing station, means adapted to hold the record tape against the capstan for movement therewith, a train of driving mechanism, normally extending between the said driving element on the carriage and the capstan for turning the capstan in steps and driving the tape when the carriage is moved in steps, first means actuated by said carriage return control to step the carriage a single forward step, and second means actuated by said carriage return control after the first means, to interrupt the train of driving mechanism, whereby when said carriage platen is moved backward by the return mechanism following operation of the carriage return control, said tape capstan and the tape will not be driven.

4. In a typewriter of the class having a keyboard, a carriage movable in horizontal longitudinal steps, a platen on the carriage moving in steps past a printing station as the carriage moves, means actuated from the keyboard to produce single space stepping of the carriage platen and typing impressions at the printing station, and functional carriage controls permitting platen movement greater than a single space step, that improvement in guiding and driving an impression receiving record tape horizontally past the printing station on the platen in single steps only, comprising, a rack on the carriage, a first gear meshing with the rack, a second gear normally meshing with the first gear but movable out of mesh therewith, tape guides directing an impression receiving record tape horizontally past the printing station, a tape driving capstan vertically journaled adjacent the printing station, a pressure roller adapted to hold the record tape against the capstan for movement therewith, a train of driving mechanism actively extending between the said second gear and the capstan for turning the capstan in steps and driving the tape when the two gears are in mesh and the carriage is moved in steps, and means actuated by said functional carriage controls to move the gears out of mesh, whereby when said carriage platen is moved more than a single step at a time following operation of the functional controls, said tape capstan and the tape will not be driven.

5. A drive for a horizontally fed record tape, in a typewriter having a platen carried by a carriage which is movable in single spacing steps in response to the actuation of certain keyboard controls on the machine, and is movable in larger spacing steps in response to the actuation of other keyboard controls on the machine, said tape drive comprising a rack on the carriage, an idler gear meshing with said rack, a tape driving gear normally biased in a direction to mesh with and be driven by said idler but movable against the bias to a position out of mesh therewith, a tape driving capstan adapted to engage and drive a record tape in contact with the capstan, a driving train actively connecting said driving gear and said tape capstan, a clutch plate normally inactive but movable to throw said driving gear out of mesh with said idler and thereby interrupt the tape drive from the carriage rack, means actuated by said certain keyboard controls to step the carriage in single spacing steps without moving the clutch plate, whereby the tape is then driven in single steps with the carriage, and means actuated by the said other keyboard controls to move the clutch plate and interrupt the tape drive before the carriage is moved in its said larger spacing steps, whereby the tape is not driven in larger steps.

6. A record tape drive according to claim 5 including step-down gearing in the said driving train whereby the driving steps of the tape capstan are smaller than the carriage steps.

7. A tape and ribbon drive according to claim 1, with a detent engaging the train of gears between the tape and ribbon capstans, whereby the capstans are held in fixed position when not being moved.

References Cited in the file of this patent

UNITED STATES PATENTS

| | | |
|---|---|---|
| 1,021,953 | Steele | Apr. 2, 1912 |
| 1,657,422 | Van Beek | Jan. 24, 1928 |
| 2,224,766 | Dodge | Dec. 10, 1940 |

FOREIGN PATENTS

| | | |
|---|---|---|
| 1,066,549 | France | June 8, 1954 |